US012404565B2

(12) United States Patent
Tanaka et al.

(10) Patent No.: US 12,404,565 B2
(45) Date of Patent: Sep. 2, 2025

(54) HIGH-STRENGTH COLD-ROLLED STEEL SHEET, HIGH-STRENGTH COATED OR PLATED STEEL SHEET, METHOD OF PRODUCING HIGH-STRENGTH COLD-ROLLED STEEL SHEET, AND METHOD OF PRODUCING HIGH-STRENGTH COATED OR PLATED STEEL SHEET

(71) Applicant: JFE STEEL CORPORATION, Tokyo (JP)

(72) Inventors: Yuji Tanaka, Tokyo (JP); Masaki Tada, Tokyo (JP); Yuki Toji, Tokyo (JP); Shinsuke Komine, Tokyo (JP); Yoshie Obata, Tokyo (JP); Yusuke Kimata, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 238 days.

(21) Appl. No.: 18/247,071

(22) PCT Filed: Aug. 5, 2021

(86) PCT No.: PCT/JP2021/029207
§ 371 (c)(1),
(2) Date: Mar. 29, 2023

(87) PCT Pub. No.: WO2022/079988
PCT Pub. Date: Apr. 21, 2022

(65) Prior Publication Data
US 2023/0374622 A1    Nov. 23, 2023

(30) Foreign Application Priority Data

Oct. 13, 2020   (JP) ................. 2020-172860

(51) Int. Cl.
| | | |
|---|---|---|
| *C21D 9/46* | (2006.01) | |
| *C21D 1/18* | (2006.01) | |
| *C21D 6/00* | (2006.01) | |
| *C21D 8/02* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/08* | (2006.01) | |
| *C22C 38/10* | (2006.01) | |
| *C22C 38/12* | (2006.01) | |

(Continued)

(52) U.S. Cl.
CPC ............... *C21D 9/46* (2013.01); *C21D 1/18* (2013.01); *C21D 6/001* (2013.01); *C21D 6/002* (2013.01); *C21D 6/005* (2013.01); *C21D 6/007* (2013.01); *C21D 6/008* (2013.01); *C21D 8/0205* (2013.01); *C21D 8/0226* (2013.01); *C21D 8/0236* (2013.01); *C21D 8/0263* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/10* (2013.01); *C22C 38/12* (2013.01); *C22C 38/14* (2013.01); *C22C 38/16* (2013.01); *C22C 38/26* (2013.01); *C22C 38/28* (2013.01); *C22C 38/32* (2013.01); *C22C 38/34* (2013.01); *C22C 38/38* (2013.01); *C22C 38/60* (2013.01); *C21D 2211/001* (2013.01); *C21D 2211/002* (2013.01); *C21D 2211/005* (2013.01); *C21D 2211/008* (2013.01)

(58) Field of Classification Search
None
See application file for complete search history.

(56) References Cited

U.S. PATENT DOCUMENTS

| | | |
|---|---|---|
| 10,526,671 B2 | 1/2020 | Hata et al. |
| 2013/0330226 A1 | 12/2013 | Murakami et al. |

(Continued)

FOREIGN PATENT DOCUMENTS

| | | |
|---|---|---|
| CN | 107849662 A | 3/2018 |
| CN | 109642281 A | 4/2019 |

(Continued)

OTHER PUBLICATIONS

Oct. 26, 2021, International Search Report issued in the International Patent Application No. PCT/JP2021/029207.
Nov. 9, 2024, Office Action issued by the China National Intellectual Property Administration in the corresponding Chinese Patent Application No. 202180069635.5 with English language search report.

(Continued)

*Primary Examiner* — Xiaobei Wang
(74) *Attorney, Agent, or Firm* — KENJA IP LAW PC

(57) ABSTRACT

A high-strength cold-rolled steel sheet comprises: a chemical composition that contains C, Si, Mn, P, S, N, Al, Ti, Nb, and B with a balance consisting of Fe and inevitable impurities, and satisfies [mol % N]/[mol % Ti]<1; and a steel microstructure in which: an area fraction of ferrite is 12% or more and less than 30%; a total area fraction of tempered martensite and bainite is 55% or more and 85% or less; an area fraction of quenched martensite is 15% or less; an area fraction of retained austenite is 1% or more and 10% or less; an area fraction of low-Mn ferrite having a Mn concentration of 0.8×[% Mn] or less is 5% or more and 20% or less; a result of subtracting the area fraction of the low-Mn ferrite from the area fraction of the ferrite is 10% or more; an area fraction of a residual microstructure is less than 3%; and an average grain size of the low-Mn ferrite is 10 μm or less.

7 Claims, No Drawings

(51) Int. Cl.
*C22C 38/14* (2006.01)
*C22C 38/16* (2006.01)
*C22C 38/26* (2006.01)
*C22C 38/28* (2006.01)
*C22C 38/32* (2006.01)
*C22C 38/34* (2006.01)
*C22C 38/38* (2006.01)
*C22C 38/60* (2006.01)

(56) References Cited

U.S. PATENT DOCUMENTS

| | | |
|---|---|---|
| 2015/0034219 A1 | 2/2015 | Kawabe et al. |
| 2017/0096723 A1* | 4/2017 | Kasuya ................... C22C 38/02 |
| 2017/0335423 A1* | 11/2017 | Murakami ............... C22C 38/08 |
| 2018/0230569 A1 | 8/2018 | Kawamura et al. |
| 2018/0305785 A1* | 10/2018 | Nakagawa ............. C21D 6/005 |
| 2019/0203315 A1 | 7/2019 | Obata et al. |
| 2022/0064752 A1 | 3/2022 | Obata et al. |
| 2022/0098696 A1 | 3/2022 | Yang et al. |

FOREIGN PATENT DOCUMENTS

| | | | |
|---|---|---|---|
| EP | 3012339 A1 | 4/2016 | |
| JP | 5464302 B2 | 4/2014 | |
| JP | 2015193897 A | 11/2015 | |
| JP | 2020164990 A | 10/2020 | |
| WO | 2012118040 A1 | 9/2012 | |
| WO | WO-2017208763 A1 * | 12/2017 | ............... C21D 9/46 |
| WO | 2020145108 A1 | 7/2020 | |
| WO | 2020158065 A1 | 8/2020 | |

OTHER PUBLICATIONS

Apr. 25, 2025, the Extended European Search Report issued by the European Patent Office in the corresponding European Patent Application No. 21879730.6.

* cited by examiner

HIGH-STRENGTH COLD-ROLLED STEEL SHEET, HIGH-STRENGTH COATED OR PLATED STEEL SHEET, METHOD OF PRODUCING HIGH-STRENGTH COLD-ROLLED STEEL SHEET, AND METHOD OF PRODUCING HIGH-STRENGTH COATED OR PLATED STEEL SHEET

TECHNICAL FIELD

The present disclosure relates to a high-strength cold-rolled steel sheet, a high-strength coated or plated steel sheet, a method of producing a high-strength cold-rolled steel sheet, and a method of producing a high-strength coated or plated steel sheet.

BACKGROUND

High-strength steel sheets are needed in order to achieve both crashworthiness and high fuel efficiency by weight reduction of automobiles. Moreover, automobile steel sheets having excellent ductility, stretch flangeability, and bendability are needed in order to improve formability by press working.

JP 2015-193897 A (PTL 1) discloses a high-strength cold-rolled steel sheet having a tensile strength of 980 MPa or more and excellent ductility and bendability. JP 5464302 B2 (PTL 2) discloses a high-strength steel sheet with excellent balance between ductility and stretch flangeability, and a method of producing the same.

CITATION LIST

Patent Literature

PTL 1: JP 2015-193897 A
PTL 2: JP 5464302 B2

SUMMARY

Technical Problem

However, stretch flangeability is not taken into account in PTL 1, and bendability is not taken into account in PTL 2. Thus, there is no steel sheet that satisfies all of strength, ductility, stretch flangeability, and bendability.

It could therefore be helpful to provide a high-strength cold-rolled steel sheet having a tensile strength (TS) of 1080 MPa or more and excellent ductility, stretch flangeability, and bendability, and a method of producing the same.

Herein, "high strength" means that the tensile strength TS measured in accordance with JIS Z 2201 is 1080 MPa or more.

Moreover, "excellent elongation" means that the elongation El measured in accordance with JIS Z 2201 is 10% or more.

Moreover, "excellent stretch flangeability" means that the hole expansion ratio ($\lambda$) measured in accordance with JIS Z 2256, which is an index of stretch flangeability, is 50% or more.

Moreover, "excellent bendability" means that the VDA bending angle measured in accordance with the German Association of the Automotive Industry standard VDA 328-100 is 85° or more.

Solution to Problem

Upon careful examination, we discovered the following:

(1) When a steel sheet containing Mn is annealed in the ferrite-austenite dual phase region, distribution of element (Mn distribution) occurs in which the Mn concentration in ferrite phase decreases whereas the Mn concentration in austenite phase increases.

(2) When the steel sheet in which the Mn distribution has occurred is cooled at an appropriate cooling rate, austenite newly transforms into ferrite around ferrite low in Mn concentration as nuclei. Since the Mn concentration of the ferrite newly formed as a result of the transformation during cooling maintains the Mn concentration of the austenite before the transformation, the ferrite formed is high in Mn concentration.

(3) The ferrite high in Mn concentration is harder than the ferrite low in Mn concentration. This hard ferrite is sandwiched between the soft ferrite low in Mn concentration and the hard bainite or tempered martensite, and thus has the effect of reducing the difference in hardness between soft phase (ferrite high in Mn concentration) and hard phase (bainite or tempered martensite). Consequently, the stretch flangeability of the high-strength cold-rolled steel sheet is improved.

(4) Finely dispersing ferrite low in Mn concentration is effective in bendability improvement.

The present disclosure is based on these discoveries. We thus provide the following.

[1] A high-strength cold-rolled steel sheet comprising: a chemical composition that contains (consists of), in mass %, C: 0.06% or more and 0.15% or less, Si: 0.10% or more and 1.8% or less, Mn: 2.00% or more and 3.50% or less, P: 0.050% or less, S: 0.0050% or less, N: 0.0060% or less, Al: 0.010% or more and 1.0% or less, Ti: 0.005% or more and 0.075% or less, Nb: 0.005% or more and 0.075% or less, and B: 0.0002% or more and 0.0040% or less with a balance consisting of Fe and inevitable impurities, and satisfies [mol % N]/[mol % Ti]<1, where [mol % N] and [mol % Ti] are respectively a content of N and a content of Ti in steel in mol %; and a steel microstructure in which: an area fraction of ferrite is 12% or more and less than 30%; a total area fraction of tempered martensite and bainite is 55% or more and 85% or less; an area fraction of quenched martensite is 15% or less; an area fraction of retained austenite is 1% or more and 10% or less; an area fraction of low-Mn ferrite having a Mn concentration of 0.8×[% Mn] or less is 5% or more and 20% or less, where [% Mn] is a content of Mn in the steel in mass %; a result of subtracting the area fraction of the low-Mn ferrite from the area fraction of the ferrite is 10% or more; an area fraction of a residual microstructure is less than 3%; and an average grain size of the low-Mn ferrite is 10 μm or less.

[2] The high-strength cold-rolled steel sheet according to [1], wherein the chemical composition further contains, in mass %, at least one element selected from the group consisting of V: 0.200% or less, Cr: 0.20% or less, Mo: 0.20% or less, Cu: 0.30% or less, Ni: 0.30% or less, Sb: 0.100% or less, Sn: 0.100% or less, Ca: 0.0050% or less, Mg: 0.0050% or less, REM: 0.0050% or less, Ta: 0.100% or less, W: 0.500% or less, Zr: 0.0200% or less, and Co: 0.100% or less.

[3] A high-strength coated or plated steel sheet comprising: the high-strength cold-rolled steel sheet according to [1] or [2]; and a coated or plated layer on at least one side of the high-strength cold-rolled steel sheet.

[4] A method of producing a high-strength cold-rolled steel sheet, the method comprising: subjecting a steel slab having the chemical composition as recited in [1] or [2] to hot rolling to obtain a hot-rolled sheet; subjecting the hot-rolled sheet to pickling; subjecting the hot-rolled sheet after the pickling to cold rolling to obtain a cold-rolled sheet; thereafter performing a first heating process in which the cold-rolled sheet is heated to a first heating temperature of $Ac_1$ point or higher and ($Ac_3$ point−50° C.) or lower and held in a first heating temperature range of $Ac_1$ point or higher and ($Ac_3$ point−50° C.) or lower for 10 s or more; thereafter performing a second heating process in which the cold-rolled sheet is heated to a second heating temperature of $Ac_3$ point or higher and ($Ac_3$ point+40° C.) or lower at a heating rate of 10° C./s or more and held in a second heating temperature range of $Ac_3$ point or higher and ($Ac_3$ point+40° C.) or lower for 5 s or more and 60 s or less; thereafter performing a first cooling process in which the cold-rolled sheet is cooled to a first cooling stop temperature of 500° C. or lower and higher than Ms point at a first cooling rate of 10° C./s or more, and then held at the first cooling stop temperature for 10 s or more and 60 s or less or cooled from the first cooling stop temperature to higher than Ms point at a third cooling rate of less than 10° C./s for 10 s or more and 60 s or less; thereafter performing a second cooling process in which the cold-rolled sheet is cooled to a second cooling stop temperature of (Ms point−100° C.) or lower and 100° C. or higher at a second cooling rate of 10° C./s or more; and thereafter performing a reheating process in which the cold-rolled sheet is reheated to a reheating temperature range of the second cooling stop temperature or higher and 450° C. or lower and held in the reheating temperature range of the second cooling stop temperature or higher and 450° C. or lower for 10 s or more and 1800 s or less, to obtain the high-strength cold-rolled steel sheet.

[5] A method of producing a high-strength coated or plated steel sheet, the method comprising subjecting, after the reheating process as recited in [4], the high-strength cold-rolled steel sheet to coating or plating treatment to obtain the high-strength coated or plated steel sheet.

[6] An automotive part obtainable using, in at least part thereof, the high-strength cold-rolled steel sheet according to [1] or [2].

[7] An automotive part obtainable using, in at least part thereof, the high-strength coated or plated steel sheet according to [3].

Advantageous Effect

It is thus possible to provide a high-strength cold-rolled steel sheet having a tensile strength of 1080 MPa or more and excellent ductility, stretch flangeability, and bendability, and a method of producing the same.

DETAILED DESCRIPTION

Embodiments of the present disclosure will be described below, although the present disclosure is not limited to the below-described embodiments.

First, the appropriate range of the chemical composition of a high-strength cold-rolled steel sheet and the reasons for limiting the chemical composition to such range will be described below. In the following description, "%" representing the content of each component element of the steel sheet is "mass %" unless otherwise stated. Herein, each numeric value range expressed in the form of "A to B" denotes a range that includes values A and B as its lower and upper limits.

[Essential Components]

C: 0.06% or More and 0.15% or Less

C contributes to higher strength by being contained in bainite or tempered martensite. C also has the effect of stabilizing retained austenite, which contributes to ductility, by concentrating in austenite. To achieve these effects, the C content is 0.06% or more. If the C content is more than 0.15%, the amount of quenched martensite increases and the stretch flangeability decreases. Therefore, the C content is 0.06% or more and 0.15% or less. The C content is preferably 0.07% or more, and more preferably 0.10% or more. The C content is preferably 0.14% or less, and more preferably 0.12% or less.

Si: 0.10% or More and 1.8% or Less

Si contributes to higher strength by solid solution strengthening. Si also suppresses the formation of cementite and contributes to stabilization of retained austenite. Accordingly, the Si content needs to be 0.10% or more. Si concentrates in ferrite in the ferrite-austenite dual phase region, and thus concentrates in the low-Mn ferrite region. If the concentration of Si in ferrite is excessive, the slip system of dislocations changes, leading to a decrease in bendability. Therefore, the Si content is 1.8% or less. The Si content is preferably 0.3% or more, and more preferably 0.5% or more. The Si content is preferably 1.6% or less, and more preferably 1.4% or less.

Mn: 2.00% or More and 3.50% or Less

Mn is an important element for solid solution strengthening of ferrite using distribution of element. If the Mn content is less than 2.00%, the solid solution strengthening effect is insufficient. If the Mn content is more than 3.50%, ferrite transformation is excessively suppressed during cooling after a reheating process, causing insufficient formation of ferrite high in Mn concentration. As a result, the stretch flangeability degrades. Therefore, the Mn content is 2.00% or more and 3.50% or less. The Mn content is preferably 2.1% or more, and more preferably 2.3% or more. The Mn content is preferably 3.2% or less, and more preferably 3.0% or less.

P: 0.050% or Less

If the P content is more than 0.050%, the weldability decreases. Therefore, the P content is 0.050% or less. No lower limit is placed on the P content, and the P content may be 0.000%. From the viewpoint of the production costs, however, the P content is preferably 0.0001% or more. The P content is preferably 0.020% or less.

S: 0.0050% or Less

If the S content is more than 0.0050%, the stretch flangeability decreases. Therefore, the S content is 0.0050% or less. No lower limit is placed on the S content, and the S content may be 0.0000%. From the viewpoint of the production costs, however, the S content is preferably 0.0001% or more. The S content is more preferably 0.0020% or less.

N: 0.0060% or Less

If the N content is excessively high, N forms nitride, causing decreases in ductility and bendability. Moreover, in the case where N combines with B to form BN, the strength increasing effect by B cannot be achieved. Therefore, the N content is 0.0060% or less. No lower limit is placed on the N content, and the N content may be 0.0000%. From the viewpoint of the production costs, however, the N content is preferably 0.0001% or more. The N content is more preferably 0.0045% or less.

Al: 0.010% or More and 1.0% or Less

Al acts as a deoxidizing material when the Al content is 0.010% or more. If the Al content is more than 1.0%, not only the effect is saturated but also the weldability decreases. Therefore, the Al content is 0.010% or more and 1.0% or less. The Al content is preferably 0.02% or more. The Al content is preferably 0.9% or less.

Ti: 0.005% or More and 0.075% or Less

Ti has the effect of fixing N in the steel as nitride TiN. To achieve this effect, the Ti content is 0.005% or more. If the Ti content is more than 0.075%, carbide forms excessively, causing a decrease in ductility. The Ti content is preferably 0.008% or more. The Ti content is preferably 0.05% or less.

Nb: 0.005% or More and 0.075% or Less

Nb has the effect of finely dispersing ferrite phase low in Mn concentration in a first heating process in the ferrite-austenite dual phase region by segregating to grain boundaries in a solid solution state or precipitating as fine carbide having a pinning effect. To achieve this effect, the Nb content is 0.005% or more. If the Nb content is more than 0.075%, not only the effect is saturated, but also carbide forms excessively and the ductility decreases. Therefore, the Nb content is 0.005% or more and 0.075% or less. The Nb content is preferably 0.008% or more. The Nb content is preferably 0.05% or less.

B: 0.0002% or More and 0.0040% or Less

B is an element that not only contributes to higher strength but also has the effect of refining ferrite phase low in Mn concentration in the first heating process in the ferrite-austenite dual phase region and improving the bendability. The B content needs to be 0.0002% or more. If the B content is more than 0.0040%, the ductility decreases. Therefore, the B content is 0.0002% or more and 0.0040% or less. The B content is preferably 0.0007% or more. The B content is preferably 0.0030% or less.

[Mol % N]/[Mol % Ti]<1

Ti has the effect of fixing N as TiN. However, if the molar quantity of the Ti content is less than or equal to the molar quantity of the N content, N not fixed by Ti combines with B, thereby reducing or eliminating the effect of adding B.

[Optional Components]

The chemical composition of the high-strength cold-rolled steel sheet according to this embodiment may, in addition to the above, further contain, in mass %, at least one element selected from the group consisting of V: 0.200% or less, Cr: 0.20% or less, Mo: 0.20% or less, Cu: 0.30% or less, Ni: 0.30% or less, Sb: 0.100% or less, Sn: 0.100% or less, Ca: 0.0050% or less, Mg: 0.0050% or less, REM: 0.0050% or less, Ta: 0.100% or less, W: 0.500% or less, Zr: 0.0200% or less, and Co: 0.100% or less.

V: 0.200% or Less

V forms fine carbide and contributes to higher strength when the V content is 0.005% or more. Accordingly, in the case of containing V, the V content is preferably 0.005% or more. To prevent coarsening of carbide to further increase the strength and achieve better ductility, the V content is preferably 0.200% or less. Accordingly, in the case of containing V, the V content is preferably 0.200% or less. The V content is more preferably 0.008% or more. The V content is more preferably 0.1% or less.

Cr: 0.20% or Less

Cr contributes to higher strength by solid solution strengthening when the Cr content is 0.05% or more. Accordingly, in the case of containing Cr, the Cr content is preferably 0.05% or more. In the case of containing Cr, the Cr content is preferably 0.20% or less from the viewpoint of preventing the formation of cementite and further improving the ductility and the stretch flangeability. The Cr content is more preferably 0.06% or more. The Cr content is more preferably 0.15% or less.

Mo: 0.20% or Less

Mo contributes to higher strength by solid solution strengthening when the Mo content is 0.01% or more. Accordingly, in the case of containing Mo, the Mo content is preferably 0.01% or more. If the Mo content is more than 0.20%, the effect is saturated. Hence, in the case of containing Mo, the Mo content is preferably 0.20% or less in order to reduce the production costs. The Mo content is more preferably 0.02% or more. The Mo content is more preferably 0.15% or less.

Cu: 0.30% or Less

Cu contributes to higher strength by solid solution strengthening when the Cu content is 0.01% or more. Accordingly, in the case of containing Cu, the Cu content is preferably 0.01% or more. In the case of containing Cu, the Cu content is preferably 0.30% or less in order to achieve better ductility and stretch flangeability. The Cu content is more preferably 0.02% or more. The Cu content is more preferably 0.20% or less.

Ni: 0.30% or Less

Ni contributes to higher strength by solid solution strengthening when the Ni content is 0.01% or more. Accordingly, in the case of containing Ni, the Ni content is preferably 0.01% or more. If the Ni content is more than 0.30%, the effect is saturated. Hence, the Ni content is preferably 0.30% or less in order to reduce the production costs. The Ni content is more preferably 0.02% or more. The Ni content is more preferably 0.20% or less.

Sb: 0.100% or Less

Sn: 0.100% or Less

Sb and Sn each have the effect of suppressing the decarburization of the steel sheet surface layer when the content is 0.002% or more. Accordingly, in the case of containing any of Sb and Sn, the content is preferably 0.002% or more. If the content of each of Sb and Sn is more than 0.100%, the effect is saturated. Hence, in the case of containing any of Sb and Sn, the content is preferably 0.100% or less from the viewpoint of reducing the production costs. The content of each of Sb and Sn is more preferably 0.004% or more. The content of each of Sb and Sn is more preferably 0.05% or less.

Ca: 0.0050% or Less

Mg: 0.0050% or Less

REM: 0.0050% or Less

Ca, Mg, and REM each act as a deoxidizing material when the content is 0.0001% or more. Accordingly, in the case of containing any of Ca, Mg, and REM, the content is preferably 0.0001% or more. In the case of containing any of Ca, Mg, and REM, the content is preferably 0.0050% or less from the viewpoint of further improving the stretch flangeability. The content of each of Ca, Mg, and REM is more preferably 0.0002% or more. The content of each of Ca, Mg, and REM is more preferably 0.0040% or less.

Ta: 0.100% or Less

Ta has the effect of increasing the strength of the steel sheet by forming fine carbide. In the case of containing Ta, the Ta content is preferably 0.001% or more in order to achieve the effect. If the Ta content is more than 0.100%, Ta carbide precipitates excessively and the ductility decreases. Accordingly, in the case of containing Ta, the Ta content is preferably 0.100% or less. The Ta content is more preferably 0.050% or less.

W: 0.500% or Less

W has the effect of increasing the strength of the steel sheet by solid solution strengthening. In the case of containing W, the W content is preferably 0.005% or more in order to achieve the effect. If the W content is more than 0.500%, W carbide precipitates excessively and the ductility decreases. Accordingly, in the case of containing W, the W content is preferably 0.500% or less. The W content is more preferably 0.300% or less.

Zr: 0.0200% or Less

Zr can be used as a deoxidizing material. In the case of containing Zr, the Zr content is preferably 0.0001% or more in order to achieve the effect. If the Zr content is more than 0.0200%, Zr carbide precipitates excessively and the ductility decreases. Accordingly, in the case of containing Zr, the Zr content is preferably 0.0200% or less. The Zr content is more preferably 0.0150% or less.

Co: 0.100% or Less

Co has the effect of increasing the strength of the steel sheet by solid solution strengthening. In the case of containing Co, the Co content is preferably 0.005% or more in order to achieve the effect. If the Co content is more than 0.100%, the effect is saturated. Accordingly, in the case of containing Co, the Co content is preferably 0.100% or less. The Co content is more preferably 0.080% or less.

The balance other than the above-described components consists of Fe and inevitable impurities. In the case where the content of any of the foregoing optional components is less than the lower limit, the component is treated as inevitable impurities as the effects according to the present disclosure are not impaired.

[Steel Microstructure]

Next, the steel microstructure of the high-strength cold-rolled steel sheet will be described below.

Ferrite: 12% or More and Less than 30% in Area Fraction

Ferrite is effective in ductility improvement. Moreover, ferrite transformation causes C to concentrate in retained austenite, with it being possible to further improve the ductility. Accordingly, the area fraction of ferrite needs to be 12% or more. If the area fraction of ferrite is 30% or more, the stretch flangeability decreases. The area fraction of ferrite is preferably 15% or more, and more preferably 18% or more. The area fraction of ferrite is preferably 28% or less, and more preferably 25% or less. This area fraction is the total area fraction of ferrite high in Mn concentration and the below-described low-Mn ferrite.

Tempered Martensite and Bainite: 55% or More and 85% or Less in Total Area Fraction Tempered martensite and bainite are microstructures having higher dislocation density than ferrite and containing cementite. Tempered martensite and bainite are effective in strength increase. To achieve high strength, the total area fraction of tempered martensite and bainite needs to be 55% or more. If the total area fraction of tempered martensite and bainite is more than 85%, the ductility decreases. The total area fraction of tempered martensite and bainite is preferably 60% or more, and more preferably 65% or more. The total area fraction of tempered martensite and bainite is preferably 75% or less.

Quenched Martensite: 15% or Less in Area Fraction

Quenched martensite is a very hard microstructure having higher dislocation density than ferrite, not containing cementite, and having C dissolved therein. If the area fraction of quenched martensite is more than 15%, the ductility, the stretch flangeability, and the bendability decrease. The area fraction of quenched martensite is preferably 13% or less, and more preferably 10% or less. No lower limit is placed on the area fraction of quenched martensite, and the area fraction of quenched martensite may be 0%. The area fraction of quenched martensite is preferably 3% or more because it is difficult to completely suppress the formation of quenched martensite.

Retained Austenite: 1% or More and 10% or Less in Area Fraction

Retained austenite contributes to improved ductility by the effect of transformation induced plasticity when its area fraction is 1% or more. If the area fraction of retained austenite is more than 10%, the stretch flangeability decreases. The area fraction of retained austenite is preferably 3% or more. The area fraction of retained austenite is preferably 8% or less.

Area Fraction of Residual Microstructures: Less than 3%

In addition to the foregoing ferrite, tempered martensite and bainite, quenched martensite, and retained austenite, the steel microstructure may contain other microstructures (residual microstructures) including pearlite and carbide such as cementite, within the range that does not impair the effects according to this embodiment. If the area fraction of the residual microstructures is 3% or more, the ductility, the stretch flangeability, and the bendability decrease. Therefore, the area fraction of the residual microstructures is less than 3%. The types and area fraction of the residual microstructures may be determined, for example, through SEM observation.

Low-Mn Ferrite Having Mn Concentration of 0.8×[% Mn] or Less: 5% or More and 20% or Less in Area Fraction Ferrite having a low Mn concentration of 0.8×[% Mn] or less is referred to as "low-Mn ferrite". Low-Mn ferrite forms as a result of heating and holding in the ferrite-austenite dual phase region in the first heating process and cooling in the first cooling process. As a result of heating and holding in the single phase region in the subsequent second heating process, ferrite turns into austenite. Here, by controlling the second heating temperature and the holding time at the second heating temperature, Mn diffusion to austenite derived from low-Mn ferrite is suppressed, and a region in which the microstructure is austenite single phase but the Mn concentration is 0.8×[% Mn] or less remains locally. The microstructure of the region low in Mn concentration preferentially undergoes ferrite transformation while maintaining the Mn concentration in the subsequent first cooling process, to form low-Mn ferrite. With the low-Mn ferrite as nuclei, ferrite transformation also progresses to austenite having a Mn concentration of more than 0.8×[% Mn], as a result of which ferrite having a Mn concentration of more than 0.8×[% Mn] (hereafter also referred to as "high-Mn ferrite") forms. The high-Mn ferrite is hard, and improves the stretch flangeability. It is therefore essential to form the low-Mn ferrite with a predetermined area fraction, in order to form the high-Mn ferrite and improve the stretch flangeability. If the area fraction of low-Mn ferrite is less than 5%, ferrite nuclei are few, and a sufficient amount of ferrite cannot be formed in the first cooling process, causing decreases in ductility and stretch flangeability. If the area fraction of low-Mn ferrite is more than 20%, the amount of ferrite is excessively large, causing decreases in strength and stretch flangeability. Therefore, the area fraction of low-Mn ferrite is 5% or more and 20% or less. The area fraction of low-Mn ferrite is preferably 7% or more, and more preferably 10% or more. The area fraction of low-Mn ferrite is preferably 18% or less, and more preferably 15% or less.

(Area Fraction of Ferrite)−(Area Fraction of Low-Mn Ferrite): 10% or More

Subtracting the area fraction of low-Mn ferrite from the area fraction of all ferrite can yield the area fraction of hard ferrite high in Mn concentration (hereafter also referred to as "high-Mn ferrite") formed in the first cooling process. High-Mn ferrite denotes ferrite higher in Mn concentration than low-Mn ferrite, i.e. ferrite having a Mn concentration of more than 0.8×[% Mn]. If (area fraction of ferrite)−(area fraction of low-Mn ferrite) is less than 10%, the amount of hard high-Mn ferrite is insufficient, and the stretch flangeability decreases. (Area fraction of ferrite)−(area fraction of low-Mn ferrite) is preferably 12% or more, and more preferably 15% or more. No upper limit is placed on (area fraction of ferrite)−(area fraction of low-Mn ferrite), but (area fraction of ferrite)−(area fraction of low-Mn ferrite) is preferably 30% or less.

Average Grain Size of Low-Mn Ferrite: 10 μm or Less

As a result of soft low-Mn ferrite being finely dispersed in the steel sheet, the bendability can be improved. For bendability improvement, low-Mn ferrite needs to be finely dispersed without connecting to each other. If the average grain size (equivalent circular diameter) of low-Mn ferrite is more than 10 μm, the bendability improving effect cannot be achieved. The average grain size of low-Mn ferrite is preferably 8 μm or less, and more preferably 6 μm or less.

The area fraction of each microstructure is measured as follows: First, a test piece for microstructure observation is collected from the high-strength cold-rolled steel sheet. A cross-section (L section) parallel to the rolling direction of the test piece is obtained, and the test piece is polished so that the position corresponding to ¼ of the thickness in the thickness (depth) direction from the steel sheet surface will be the observation plane, and etched with 3% nital. The observation plane is observed using a scanning electron microscope (SEM) with 2000 magnification, and a microstructure image is obtained.

(Ferrite)

The area fraction of ferrite is determined as follows: High-Mn ferrite and low-Mn ferrite are observed with the same contrast in secondary electron image observation using SEM, and are distinguishable from the other microstructures. By image analysis of the microstructure image obtained as described above, the area fraction of ferrite and the area fraction of the other microstructures are determined.

(Quenched Martensite)

The area fraction of quenched martensite is determined as follows: The same observation field as the microstructure image is observed by SEM electron backscatter diffraction (EBSD), and analyzed using an image quality map (IQ map). The region with a lower IQ value than the surroundings is taken to be quenched martensite, and its area fraction is determined.

(Retained Austenite)

The area fraction of retained austenite is determined as follows: A test piece is collected from the high-strength cold-rolled steel sheet. The test piece is ground and polished in the thickness (depth) direction so that the position corresponding to ¼ of the thickness in the thickness (depth) direction from the steel sheet surface will be the measurement plane. The measurement plane is analyzed by X-ray diffractometry, and the amount of retained austenite is determined. The ratios of the peak intensities of {111}, {200}, {220}, and {311} planes of austenite to the peak intensities of {110}, {200}, and {211} planes of ferrite are calculated, and the amount of austenite is calculated from the average value of the ratios. With this method, the volume fraction of austenite is obtained, which is taken to be the area fraction of austenite.

(Tempered Martensite and Bainite)

The total area fraction of tempered martensite and bainite is determined by subtracting the area fraction of quenched martensite and the area fraction of retained austenite from the microstructure proportion other than ferrite.

(Low-Mn Ferrite)

The area fraction and average grain size of low-Mn ferrite are determined as follows: A test piece is collected from the high-strength cold-rolled steel sheet. The test piece is polished in the thickness (depth) direction so that the position corresponding to ¼ of the thickness in the thickness (depth) direction from the steel sheet surface will be the analysis plane. The Mn concentration in a region of 100×100 μm² of the analysis plane is measured using an electron probe microanalyzer (EPMA). The area fraction of low-Mn ferrite is determined as the area fraction of a region of 0.8×[% Mn] or less by image analysis, based on the Mn concentration measurement result by the EPMA. The average grain size (equivalent circular diameter) of low-Mn ferrite is determined by image analysis, based on the region of 0.8×[% Mn] or less.

The thickness of the high-strength cold-rolled steel sheet is not limited, but is typically 0.3 mm or more and 2.8 mm or less.

The high-strength cold-rolled steel sheet may have a coated or plated layer on at least one side, for corrosion resistance improvement. The coated or plated layer is preferably any of a hot-dip galvanized layer, a galvannealed layer, and an electrogalvanized layer. The composition of the coated or plated layer is not limited, and may be a known composition.

The composition of the hot-dip galvanized layer is not limited, and may be a typical composition. In one example, the coated or plated layer has a composition containing Fe: 20 mass % or less and Al: 0.001 mass % or more and 1.0 mass % or less and further containing one or more selected from the group consisting of Pb, Sb, Si, Sn, Mg, Mn, Ni, Cr, Co, Ca, Cu, Li, Ti, Be, Bi, and REM: 0 mass % or more and 3.5 mass % or less in total with the balance consisting of Zn and inevitable impurities. In the case where the coated or plated layer is a hot-dip galvanized layer, for example, the Fe content in the coated or plated layer is less than 7 mass %. In the case where the coated or plated layer is a galvannealed layer, for example, the Fe content in the coated or plated layer is 7 mass % or more and 15 mass % or less, and more preferably 8 mass % or more and 13 mass % or less.

The coating weight is not limited, but the coating weight per one side of the high-strength cold-rolled steel sheet is preferably 20 g/m² to 80 g/m². In one example, the coated or plated layer is formed on both the front and back sides of the high-strength cold-rolled steel sheet.

A method of producing a high-strength cold-rolled steel sheet will be described below. The method of producing a high-strength cold-rolled steel sheet according to this embodiment may be a method of producing a high-strength cold-rolled steel sheet, comprising: subjecting a steel slab having the foregoing chemical composition to hot rolling to obtain a hot-rolled sheet; subjecting the hot-rolled sheet to pickling; subjecting the hot-rolled sheet after the pickling to cold rolling to obtain a cold-rolled sheet; thereafter performing a first heating process in which the cold-rolled sheet is heated to a first heating temperature of $Ac_1$ point or higher and ($Ac_3$ point−50° C.) or lower and held in a first heating temperature range of $Ac_1$ point or higher and ($Ac_3$ point−50°

C.) or lower for 10 s or more; thereafter performing a second heating process in which the cold-rolled sheet is heated to a second heating temperature of $Ac_3$ point or higher and ($Ac_3$ point+40° C.) or lower at a heating rate of 10° C./s or more and held in a second heating temperature range of $Ac_3$ point or higher and ($Ac_3$ point+40° C.) or lower for 5 s or more and 60 s or less; thereafter performing a first cooling process in which the cold-rolled sheet is cooled to a first cooling stop temperature of 500° C. or lower and higher than Ms point at a first cooling rate of 10° C./s or more, and then held at the first cooling stop temperature for 10 s or more and 60 s or less or cooled from the first cooling stop temperature to higher than Ms point at a third cooling rate of less than 10° C./s for 10 s or more and 60 s or less; thereafter performing a second cooling process in which the cold-rolled sheet is cooled to a second cooling stop temperature of (Ms point–100° C.) or lower and 100° C. or higher at a second cooling rate of 10° C./s or more; and thereafter performing a reheating process in which the cold-rolled sheet is reheated to a reheating temperature of the second cooling stop temperature or higher and 450° C. or lower and held in a reheating temperature range of the second cooling stop temperature or higher and 450° C. or lower for 10 s or more and 1800 s or less, to obtain the high-strength cold-rolled steel sheet.

First, a steel slab having the foregoing chemical composition is subjected to hot rolling to obtain a hot-rolled sheet.

First, a steel slab having the foregoing chemical composition is produced. A steel material is smelted to obtain molten steel having the foregoing chemical composition. The smelting method is not limited, and may be any known smelting method such as converter smelting or electric furnace smelting. The obtained molten steel is solidified to produce a steel slab (slab). The method of producing the steel slab from the molten steel is not limited, and may be continuous casting, ingot casting, thin slab casting, or the like. The steel slab may be cooled and then reheated before hot rolling. Alternatively, the cast steel slab may be continuously hot rolled, without being cooled to room temperature.

The produced steel slab is then subjected to hot rolling that includes rough rolling and rolling finish, to obtain a hot-rolled sheet.

In one example, the produced steel slab is cooled to room temperature, then heated, and then rolled. Alternatively, hot rolling may be performed using an energy saving process. Examples of the energy saving process include hot direct rolling in which the produced steel slab is, without being cooled to room temperature, charged into a heating furnace as a warm slab and hot rolled, and direct rolling in which the produced steel slab is heat-held for a short period of time and then immediately rolled.

The hot-rolling start temperature is preferably 1100° C. or higher. If the hot-rolling start temperature is 1100° C. or higher, the rolling load can be further reduced. The hot-rolling start temperature is preferably 1300° C. or lower, from the viewpoint of further reducing the heating costs.

The rolling finish temperature is preferably $Ar_3$ point or higher. If the rolling finish temperature is $Ar_3$ point or higher, the hot-rolled microstructure can be made more uniform and the ductility of the high-strength cold-rolled steel sheet can be further improved. The rolling finish temperature is preferably 1000° C. or lower. If the rolling finish temperature is 1000° C. or lower, coarsening of the hot-rolled microstructure can be prevented and the bendability of the high-strength cold-rolled steel sheet can be further improved.

The coiling temperature of the hot-rolled sheet after the completion of the hot rolling is preferably 500° C. or lower. If the coiling temperature is 500° C. or lower, the formation of ferrite-pearlite layered microstructure is prevented and ferrite is prevented from connecting in the first heating process, so that the bendability can be further improved.

The hot-rolled sheet is then subjected to pickling. As a result of pickling, scale on the hot-rolled sheet surface can be removed. The pickling conditions may be in accordance with conventional methods.

The hot-rolled sheet after the pickling is then subjected to cold rolling to obtain a cold-rolled sheet. The cold rolling conditions may be in accordance with conventional methods. The rolling ratio in the cold rolling is not limited, and may be, for example, 30% or more, and 80% or less.

The cold-rolled sheet is then subjected to annealing that includes a first heating process, a second heating process, a first cooling process, a second cooling process, and a reheating process. In one example, the cold-rolled sheet obtained as described above is supplied to a continuous annealing furnace to be annealed. In the case of forming a hot-dip galvanized layer or a galvannealed layer on the surface of the high-strength cold-rolled steel sheet, the cold-rolled sheet may be supplied to a continuous hot-dip galvanizing apparatus to continuously perform annealing and coating or plating treatment.

First, the first heating process is performed in which the cold-rolled sheet is heated to a first heating temperature of $Ac_1$ point or higher and ($Ac_3$ point–50° C.) or lower and held in a first heating temperature range of $Ac_1$ point or higher and ($Ac_3$ point–50° C.) or lower for 10 s or more.

First Heating Temperature and First Heating Temperature Range: $Ac_1$ point or higher and ($Ac_3$ Point–50° C.) or Lower In the first heating process, the cold-rolled sheet is heated and held in the ferrite-austenite dual phase region, to cause Mn distribution in which the Mn concentration in ferrite phase decreases and the Mn concentration in austenite phase increases. As a result, low-Mn ferrite forms. If the first heating temperature and the first heating temperature range are lower than $Ac_1$ point, the Mn distribution does not occur. If the first heating temperature and the first heating temperature range are higher than ($Ac_3$ point–50° C.), coarse ferrite forms. Such coarse ferrite is not refined even by the second heating process, causing the average grain size of low-Mn ferrite to exceed 10 µm and causing a decrease in bendability. Therefore, the first heating temperature and the first heating temperature range are $Ac_1$ point or higher and ($Ac_3$ point–50° C.) or lower. The first heating temperature and the first heating temperature range are preferably ($Ac_1$ point+10° C.) or higher, and more preferably ($Ac_1$ point+30° C.) or higher. The first heating temperature and the first heating temperature range are preferably ($Ac_3$ point–60° C.) or lower. Herein, "holding temperature in a predetermined temperature range" means that the temperature may change within the temperature range, and does not require isothermal holding at a predetermined temperature. $Ac_1$ and $Ac_3$ are calculated using the following formulas (1) and (2) respectively:

$$Ac_1(°C.)=751-16[\%\,C]+35[\%\,Si]-28[\%\,Mn]-5.5[\%\,Cu]-16[\%\,Ni]+13[\%\,Cr]+3.4[\%\,Mo] \quad (1)$$

$$Ac_3(°C.)=881-206[\%\,C]+53[\%\,Si]-15[\%\,Mn]-27[\%\,Cu]-20[\%\,Ni]-1[\%\,Cr]+41[\%\,Mo] \quad (2)$$

where [% M] denotes the content (mass %) of M in steel.

First Holding Time: 10 s or More

The holding time (first holding time) in the first heating temperature range is 10 s or more. If the first holding time is less than 10 s, the Mn distribution is insufficient and high-Mn ferrite cannot be formed sufficiently, causing a decrease in stretch flangeability. No upper limit is placed on the first holding time, but the first holding time is preferably 1800 s or less from the viewpoint of productivity. The first holding time is preferably 20 s or more, and more preferably 100 s or more. The first holding time is preferably 1500 s or less.

Next, the second heating process is performed in which the cold-rolled sheet is heated to a second heating temperature of $Ac_3$ point or higher and ($Ac_3$ point+40° C.) or lower at a heating rate of 10° C./s or more and held in a second heating temperature range of $Ac_3$ point or higher and ($Ac_3$ point+40° C.) or lower for 5 s or more and 60 s or less.

In the second heating process, while maintaining the Mn concentration of the low-Mn ferrite formed in the foregoing first heating process, austenite single phase microstructure is formed.

Heating Rate: 10° C./s or More

If the heating rate is less than 10° C./s, Mn diffuses uniformly upon heating to $Ac_3$ point or higher, so that low-Mn ferrite cannot be obtained and the ductility and the stretch flangeability decrease. The heating rate is preferably 15° C./s or more. No upper limit is placed on the heating rate, but the heating rate is preferably 50° C./s or less from the viewpoint of production technology.

Second Heating Temperature and Second Heating Temperature Range: $Ac_3$ point or higher and ($Ac_3$ Point+40° C.) or Lower If the second heating temperature and the second heating temperature range are lower than $Ac_3$ point, ferrite remains. With such ferrite as nuclei, a large amount of ferrite forms in the following first cooling process, and the stretch flangeability decreases. The strength decreases, too. If the second heating temperature and the second heating temperature range are higher than ($Ac_3$ point+40° C.), Mn diffusion to the region low in Mn concentration derived from low-Mn ferrite occurs. As a result, the area fraction of the region low in Mn concentration decreases, and further austenite coarsens, so that the grain boundary area serving as ferrite nucleation sites in the subsequent first cooling process decreases. This hinders ferrite transformation in terms of both Mn concentration and nucleation sites during cooling in the first cooling process, and the ductility decreases. The bendability decreases, too. The second heating temperature and the second heating temperature range are preferably $Ac_{3+5}$° C. or higher, and more preferably (first heating temperature+10° C.) or higher. The second heating temperature and the second heating temperature range are preferably ($Ac_3$ point+35° C.) or lower, and more preferably ($Ac_3$ point+30° C.) or lower.

Second Holding Time: 5 s or More and 60 s or Less

If the holding time (second holding time) in the second heating temperature range is less than 5 s, austenite transformation is incomplete and ferrite remains, and ferrite transformation occurs excessively in the following first cooling process, so that the strength and the stretch flangeability decrease. If the second holding time is more than 60 s, Mn diffusion to the region low in Mn concentration derived from low-Mn ferrite occurs, and as a result the area fraction of the region low in Mn concentration decreases. This causes the area fraction of low-Mn ferrite finally obtained to be less than 5%, and causes a decrease in ductility. The second holding time is preferably 10 s or more, and more preferably 20 s or more. The second holding time is preferably 40 s or less, and more preferably 30 s or less.

Next, the first cooling process is performed in which the cold-rolled sheet is cooled to a first cooling stop temperature of 500° C. or lower and higher than Ms point at a first cooling rate of 10° C./s or more, and then held at the first cooling stop temperature for 10 s or more and 60 s or less or cooled from the first cooling stop temperature to higher than Ms point at a third cooling rate of less than 10° C./s for 10 s or more and 60 s or less.

First Cooling Stop Temperature: 500° C. or Lower and Higher than Ms Point

As a result of the cold-rolled sheet cooled to the first cooling stop temperature being held at the first cooling stop temperature or being mild cooled from the first cooling stop temperature to higher than Ms point at the third cooling rate of less than 10° C./s, hard high-Mn ferrite forms by ferrite transformation. If the first cooling stop temperature is higher than 500° C., pearlite forms instead of hard ferrite, causing decreases in ductility, stretch flangeability, and bendability. If the first cooling stop temperature is Ms point or lower, martensite transformation occurs instead of the formation of hard high-Mn ferrite by ferrite transformation, causing decreases in ductility and stretch flangeability. Therefore, the first cooling stop temperature is 500° C. or lower and higher than Ms point. The first cooling stop temperature is preferably 470° C. or lower, and more preferably 450° C. or lower. The first cooling stop temperature is preferably (Ms point+10° C.) or higher, and more preferably (Ms point+20° C.) or higher. Ms is calculated using the following formula (3):

$$Ms(° C.)=561-474[\% C]-7.5[\% Si]-33[\% Mn]-17[\% Ni]-17[\% Cr]-21[\% Mo] \quad (3)$$

where [% M] denotes the content (mass %) of M in steel.

First Cooling Rate: 10° C./s or More

If the first cooling rate to the first cooling stop temperature is less than 10° C./s, pearlite forms with an area fraction of 3% or more, causing decreases in ductility, stretch flangeability, and bendability. The first cooling rate is preferably 15° C./s or more. No upper limit is placed on the first cooling rate, but the first cooling rate is preferably 100° C./s or less from the viewpoint of production equipment.

Holding or Mild Cooling Time: 10 s or More and 60 s or Less

As a result of the cold-rolled sheet being held at the first cooling stop temperature or being mild cooled from the first cooling stop temperature to higher than Ms point at the third cooling rate of less than 10° C./s, hard high-Mn ferrite forms. If the holding time (third holding time) at the first cooling stop temperature or the mild cooling time from the first cooling stop temperature to higher than Ms point is less than 10 s, (area fraction of ferrite)−(area fraction of low-Mn ferrite) falls below 10%, causing a decrease in stretch flangeability. If the holding time at the first cooling stop temperature or the mild cooling time from the first cooling stop temperature to higher than Ms point is more than 60 s, the area fraction of tempered martensite and bainite falls below 55%, causing a decrease in strength. Therefore, the holding time at the first cooling stop temperature or the mild cooling time from the first cooling stop temperature to higher than Ms point is 10 s or more and 60 s or less. The holding time at the first cooling stop temperature or the mild cooling time from the first cooling stop temperature to higher than Ms point is preferably 20 s or more, and more preferably 30 s or more. The holding time at the first cooling stop temperature or the mild cooling time from the first cooling stop temperature to higher than Ms point is preferably 50 s or less, and more preferably 40 s or less.

Third Cooling Rate: Less than 10° C./s

In the case of mild cooling the cold-rolled sheet from the first cooling stop temperature, the mild cooling rate (third cooling rate) is less than 10° C./s. If the third cooling rate is 10° C./s or more, (area fraction of ferrite)−(area fraction of low-Mn ferrite) falls below 10%, causing a decrease in stretch flangeability. The mild cooling rate is preferably 5° C./s or less. If the temperature reaches Ms point or lower during cooling, the area fraction of ferrite falls below 12%, causing a decrease in ductility.

Next, the second cooling process is performed in which the cold-rolled sheet is cooled to a second cooling stop temperature of (Ms point−100° C.) or lower and 100° C. or higher at a second cooling rate of 10° C./s or more.
Second Cooling Stop Temperature: (Ms Point−100° C.) or Lower and 100° C. or Higher As a result of the cold-rolled sheet being cooled to the second cooling stop temperature of (Ms point−100° C.) or lower and 100° C. or higher, untransformed austenite undergoes martensite transformation or bainite transformation. If the second cooling stop temperature is higher than (Ms point−100° C.), quenched martensite increases, causing a decrease in ductility. Since C has not concentrated in untransformed austenite during the cooling process to the second cooling stop temperature, if the second cooling stop temperature is lower than 100° C., the area fraction of retained austenite falls below 1%, causing a decrease in ductility. Therefore, the second cooling stop temperature is (Ms point−100° C.) or lower and 100° C. or higher. The second cooling stop temperature is preferably (Ms point−120° C.) or lower, and more preferably (Ms point−150° C.) or lower. The second cooling stop temperature is preferably 120° C. or higher, and more preferably 150° C. or higher.
Second Cooling Rate: 10° C./s or More The second cooling rate is 10° C./s or more. If the second cooling rate is less than 10° C./s, untransformed austenite stabilizes and martensite transformation or bainite transformation is suppressed. The untransformed austenite transforms into quenched martensite in final cooling after the reheating process, causing decreases in ductility and stretch flangeability. The second cooling rate is preferably 15° C./s or more, and more preferably 20° C./s or more. No upper limit is placed on the second cooling rate, but the second cooling rate is preferably 100° C./s or less from the viewpoint of production equipment.

Next, the reheating process is performed in which the cold-rolled sheet is reheated to a reheating temperature of the second cooling stop temperature or higher and 450° C. or lower and held in a reheating temperature range of the second cooling stop temperature or higher and 450° C. or lower for 10 s or more and 1800 s or less.
Reheating Temperature and Reheating Temperature Range: Second Cooling Stop Temperature or Higher and 450° C. or Lower As a result of reheating, martensite or bainite is tempered to improve the ductility, and also C distribution to untransformed austenite stabilizes retained austenite to further improve the ductility. If the reheating temperature and the reheating temperature range are higher than 450° C., C oversaturated in martensite or bainite precipitates as cementite. This suppresses concentration of C into retained austenite and causes a decrease in ductility. The reheating temperature and the reheating temperature range are preferably 420° C. or lower, and more preferably 400° C. or lower. The heating rate to the reheating temperature is not limited.

Fourth Holding Time: 10 s or More and 1800 s or Less

If the holding time (fourth holding time) in the reheating temperature range is less than 10 s, C distribution to retained austenite does not occur, and quenched martensite forms in final cooling after the reheating process, causing decreases in ductility and stretch flangeability. The fourth holding time is preferably 20 s or more, and more preferably 100 s or more. If the fourth holding time is more than 1800 s, retained austenite decomposes into pearlite and the area ratio of pearlite reaches 3% or more, causing decreases in ductility, stretch flangeability, and bendability. The fourth holding time is more preferably 1500 s or less.

The production conditions other than those described above may be in accordance with conventional methods.

A method of producing a high-strength coated or plated steel sheet will be described below.

The method of producing a high-strength coated or plated steel sheet according to this embodiment is a method of producing a high-strength coated or plated steel sheet comprising subjecting, after the foregoing reheating process, the high-strength cold-rolled steel sheet to coating or plating treatment to obtain the high-strength coated or plated steel sheet.

The coating or plating treatment may be performed under known conditions. As the coating or plating treatment, hot-dip galvanizing, galvannealing, or electrogalvanizing is preferable.
[Automotive Part]

An automotive part in at least part of which the foregoing high-strength steel or high-strength coated or plated steel sheet is used can be provided. In one example, the foregoing high-strength steel or high-strength coated or plated steel sheet is formed into a desired shape by press working to obtain an automotive part. The automotive part may include, as material, one or more steel sheets other than the high-strength steel sheet or high-strength coated or plated steel sheet according to this embodiment. According to this embodiment, a high-strength steel sheet having TS of 1080 MPa or more and having all of ductility, stretch flangeability, and bendability can be provided. This is suitable as an automotive part that contributes to weight reduction of the automotive body. The high-strength steel sheet or high-strength coated or plated steel sheet is especially suitable for use in all types of members used as framework structural parts or reinforcing parts, among automotive parts.

EXAMPLES

Steel materials having the chemical compositions shown in Table 1 with the balance consisting of Fe and inevitable impurities were each smelted to obtain a steel slab. The steel slab was reheated, and then subjected to hot rolling to obtain a hot-rolled sheet. The hot-rolled sheet was subjected to pickling and cold rolling to obtain a cold-rolled sheet. The cold-rolled sheet was then subjected to the first heating process, the second heating process, the first cooling process, the second cooling process, and the reheating process to obtain a cold-rolled steel sheet (CR). The thickness of the hot-rolled sheet was 3.0 mm, the cold rolling ratio was 60%, and the thickness of the cold-rolled sheet was 1.2 mm. The slab heating temperature (SRT), the rolling finish temperature (FDT), the coiling temperature (CT), the first heating temperature, the first holding time, the heating rate, the second heating temperature, the second holding time, the first cooling stop temperature, the first cooling rate, the third holding time, the second cooling stop temperature, the second cooling rate, the reheating temperature, and the fourth holding time are shown in Tables 2-1 and 2-2. In the first heating process, the second heating process, the first cooling process, the second cooling process, and the reheating process, isothermal holding was performed at the first heating temperature, the second heating temperature, the first cooling stop temperature, the second cooling stop temperature, and the reheating temperature respectively, except for Example No. 42. For Example No. 42, mild cooling was performed from the first cooling stop temperature to 415° C. for 35 s in the first cooling process.

Some of the cold-rolled steel sheets were, after the reheating process, further subjected to hot-dip galvanizing treatment to form a hot-dip galvanized layer on the surface and thus obtain a hot-dip galvanized steel sheet (GI). In the hot-dip galvanizing treatment, using a continuous hot-dip galvanizing line, a cold-rolled and annealed sheet as a result of annealing was optionally reheated to a temperature of 430° C. to 480° C., and the cold-rolled and annealed sheet was immersed in a hot-dip galvanizing bath (bath temperature: 470° C.) and the coating weight per one side was adjusted to 45 g/m². The bath composition of the hot-dip galvanizing bath in the case of producing the hot-dip galvanized steel sheet was a composition containing Al: 0.18 mass % with the balance consisting of Fe and inevitable impurities. For some of the hot-dip galvanized steel sheets, after the coating or plating treatment using the hot-dip galvanizing bath having a bath composition containing Al: 0.18 mass % with the balance consisting of Fe and inevitable impurities, alloying treatment was performed at 520° C. to alloy the hot-dip galvanized layer and thus obtain a galvannealed steel sheet (GA). The Fe concentration in the galvannealed layer was 9 mass % or more and 12 mass % or less. Some of the cold-rolled steel sheets were, after the annealing process, further subjected to electrogalvanizing treatment using an electrogalvanizing line so that the coating weight would be 30 g/m² per one side, thus obtaining an electrogalvanized steel sheet (EG).

Test pieces were collected from each obtained high-strength cold-rolled steel sheet, and microstructure observation was conducted by the foregoing methods. Moreover, a tensile test, a hole expanding test, and a VDA bending test were conducted by the below-described methods. The results are shown in Tables 3-1 and 3-2.

(Tensile Test)

The tensile test was conducted using a No. 5 test piece defined in JIS Z 2201, and the tensile strength and the elongation were measured in accordance with JIS Z 2201. The test piece was cut out so that its longitudinal direction would be orthogonal to the rolling direction.

(Hole Expanding Test)

A test piece of 100 mm in width and 100 m in length was collected from the cold-rolled steel sheet or coated or plated steel sheet, and the hole expanding test was conducted in accordance with JIS Z 2256 (2010). The test piece was punched with a clearance of 12±1% to create a hole of 10 mmφ, and a conical punch with an apex angle of 60° was raised to expand the hole. The rise of the punch was stopped when cracking occurred in the thickness direction. The hole expansion ratio $\lambda$ was calculated from the hole diameter after the crack initiation and the hole diameter before the test, using the following formula:

$$\text{Maximum hole expansion ratio: } \lambda(\%) = \{(D_f - D_0)/D_0\} \times 100$$

where $D_f$ is the hole diameter (mm) at the time of crack initiation and $D_0$ is the initial hole diameter (mm). The stretch flangeability was determined as good in the case where the value of $\lambda$ was 50% or more, regardless of the strength of the steel sheet.

(VDA Bending Test)

A test piece of 60 mm in width and 60 mm in length was collected from the cold-rolled steel sheet or coated or plated steel sheet, and the VDA bending angle was measured in accordance with the German Industry Standard (VDA238-100). The bending direction was orthogonal to the rolling direction, and the displacement at the maximum load in the bending test was converted into the bending angle in accordance with the standard.

TABLE 1

| Steel sample ID | C | Si | Mn | P | S | N | Al | Ti | Nb | B | Others | [mol % N]/[mol % Ti] | Remarks |
|---|---|---|---|---|---|---|---|---|---|---|---|---|---|
| A | 0.08 | 1.00 | 2.56 | 0.008 | 0.0011 | 0.0032 | 0.05 | 0.030 | 0.020 | 0.0011 | | 0.365 | Disclosed steel |
| B | 0.12 | 0.54 | 3.12 | 0.011 | 0.0009 | 0.0041 | 0.20 | 0.020 | 0.010 | 0.0016 | | 0.701 | Disclosed steel |
| C | 0.14 | 1.50 | 2.84 | 0.013 | 0.0018 | 0.0036 | 0.04 | 0.040 | 0.020 | 0.0009 | | 0.308 | Disclosed steel |
| D | 0.04 | 1.20 | 2.52 | 0.015 | 0.0010 | 0.0033 | 0.05 | 0.030 | 0.030 | 0.0012 | | 0.376 | Comparative steel |
| E | 0.18 | 1.40 | 3.22 | 0.016 | 0.0014 | 0.0042 | 0.05 | 0.020 | 0.020 | 0.0011 | | 0.719 | Comparative steel |
| F | 0.09 | 0.02 | 2.27 | 0.011 | 0.0008 | 0.0036 | 0.10 | 0.030 | 0.020 | 0.0010 | | 0.411 | Comparative steel |
| G | 0.10 | 2.00 | 2.16 | 0.012 | 0.0013 | 0.0031 | 0.10 | 0.040 | 0.010 | 0.0009 | | 0.265 | Comparative steel |
| H | 0.13 | 1.10 | 1.82 | 0.009 | 0.0011 | 0.0029 | 0.20 | 0.030 | 0.020 | 0.0010 | | 0.331 | Comparative steel |
| I | 0.07 | 0.62 | 3.91 | 0.014 | 0.0012 | 0.0038 | 0.20 | 0.020 | 0.030 | 0.0011 | | 0.650 | Comparative steel |
| J | 0.11 | 0.94 | 3.16 | 0.014 | 0.0011 | 0.0048 | 0.10 | 0.007 | 0.010 | 0.0012 | | 2.346 | Comparative steel |
| K | 0.07 | 0.81 | 2.66 | 0.011 | 0.0010 | 0.0041 | 0.20 | 0.020 | 0.001 | 0.0009 | | 0.701 | Comparative steel |
| L | 0.07 | 1.40 | 2.82 | 0.013 | 0.0016 | 0.0033 | 0.20 | 0.030 | 0.020 | — | | 0.376 | Comparative steel |
| M | 0.11 | 0.45 | 2.77 | 0.011 | 0.0013 | 0.0038 | 0.40 | 0.030 | 0.020 | 0.0014 | | 0.433 | Disclosed steel |
| N | 0.07 | 1.10 | 2.78 | 0.012 | 0.0010 | 0.0032 | 0.60 | 0.020 | 0.020 | 0.0011 | V 0.08 | 0.547 | Disclosed steel |
| O | 0.09 | 1.60 | 2.22 | 0.014 | 0.0008 | 0.0035 | 0.20 | 0.020 | 0.030 | 0.0014 | Cr 0.11 | 0.599 | Disclosed steel |
| P | 0.11 | 0.34 | 2.34 | 0.012 | 0.0011 | 0.0031 | 0.40 | 0.020 | 0.020 | 0.0016 | Mo 0.08 | 0.530 | Disclosed steel |
| Q | 0.09 | 0.75 | 2.82 | 0.014 | 0.0013 | 0.0038 | 0.20 | 0.020 | 0.020 | 0.0015 | Cu 0.10, Ni 0.10 | 0.650 | Disclosed steel |
| R | 0.10 | 1.10 | 3.08 | 0.011 | 0.0010 | 0.0038 | 0.30 | 0.020 | 0.015 | 0.0009 | Sb 0.004, Sb 0.005 | 0.650 | Disclosed steel |
| S | 0.13 | 0.89 | 2.96 | 0.010 | 0.0011 | 0.0040 | 0.40 | 0.020 | 0.030 | 0.0011 | Ca 0.0011 | 0.684 | Disclosed steel |
| T | 0.08 | 1.40 | 2.36 | 0.011 | 0.0014 | 0.0033 | 0.50 | 0.030 | 0.020 | 0.0012 | Mg 0.0008 | 0.376 | Disclosed steel |
| U | 0.12 | 1.30 | 3.11 | 0.009 | 0.0009 | 0.0035 | 0.40 | 0.020 | 0.020 | 0.0013 | REM 0.0015 | 0.599 | Disclosed steel |
| V | 0.11 | 0.95 | 2.44 | 0.011 | 0.0011 | 0.0055 | 0.10 | 0.015 | 0.030 | 0.0018 | | 1.255 | Comparative steel |
| W | 0.10 | 0.84 | 2.65 | 0.010 | 0.0012 | 0.0042 | 0.20 | 0.020 | 0.025 | 0.0016 | | 0.719 | Disclosed steel |

TABLE 1-continued

| Steel sample ID | C | Si | Mn | P | S | N | Al | Ti | Nb | B | Others | [mol % N]/ [mol % Ti] | Remarks |
|---|---|---|---|---|---|---|---|---|---|---|---|---|---|
| X | 0.12 | 1.00 | 2.71 | 0.009 | 0.0010 | 0.0037 | 0.10 | 0.030 | 0.020 | 0.0014 | | 0.422 | Disclosed steel |
| AA | 0.09 | 0.82 | 2.36 | 0.010 | 0.0011 | 0.0036 | 0.06 | 0.020 | 0.030 | 0.0016 | Ta 0.030 | 0.616 | Disclosed steel |
| AB | 0.10 | 1.21 | 2.57 | 0.010 | 0.0011 | 0.0037 | 0.05 | 0.030 | 0.025 | 0.0018 | W 0.220 | 0.422 | Disclosed steel |
| AC | 0.10 | 0.58 | 2.62 | 0.011 | 0.0010 | 0.0042 | 0.05 | 0.020 | 0.030 | 0.0015 | Zr 0.0110 | 0.719 | Disclosed steel |
| AD | 0.09 | 0.94 | 2.81 | 0.010 | 0.0010 | 0.0039 | 0.08 | 0.020 | 0.020 | 0.0022 | Co 0.060 | 0.667 | Disclosed steel |

* Underlines indicate outside the appropriate range according to the present disclosure.

TABLE 2-1

| | | | | | | | | First heating | | Second heating | | |
|---|---|---|---|---|---|---|---|---|---|---|---|---|
| No | Steel sample ID | Ac1 (° C.) | Ac3 (° C.) | Ms (° C.) | SRT (° C.) | FDT (° C.) | CT (° C.) | First heating temperature (° C.) | First holding time (s) | Heating rate (° C./s) | Second heating temperature (° C.) | Second holding time (s) |
| 1 | A | 713 | 879 | 431 | 1180 | 920 | 480 | 800 | 300 | 20 | <u>850</u> | 20 |
| 2 | A | 713 | 879 | 431 | 1180 | 920 | 480 | <u>840</u> | 410 | 20 | <u>890</u> | 10 |
| 3 | A | 713 | 879 | 431 | 1180 | 920 | 480 | <u>800</u> | 400 | 20 | 900 | 20 |
| 4 | A | 713 | 879 | 431 | 1180 | 920 | 480 | 810 | 100 | 20 | 900 | 10 |
| 5 | A | 713 | 879 | 431 | 1180 | 920 | 480 | 790 | 60 | 20 | 910 | 30 |
| 6 | A | 713 | 879 | 431 | 1180 | 920 | 480 | 800 | 450 | 20 | 890 | 30 |
| 7 | B | 681 | 838 | 397 | 1200 | 890 | 450 | 760 | 240 | 20 | 850 | 40 |
| 8 | B | 681 | 838 | 397 | 1200 | 890 | 450 | 760 | <u>5</u> | 20 | 850 | 20 |
| 9 | B | 681 | 838 | 397 | 1200 | 890 | 450 | 750 | <u>240</u> | 20 | <u>900</u> | 20 |
| 10 | B | 681 | 838 | 397 | 1200 | 890 | 450 | 740 | 300 | 20 | <u>860</u> | 40 |
| 11 | B | 681 | 838 | 397 | 1200 | 890 | 450 | 740 | 360 | 20 | 850 | 20 |
| 12 | C | 722 | 889 | 390 | 1220 | 900 | 460 | 790 | 100 | 15 | 900 | 30 |
| 13 | C | 722 | 889 | 390 | 1220 | 900 | 460 | 800 | 240 | 15 | 910 | <u>90</u> |
| 14 | C | 722 | 889 | 390 | 1220 | 900 | 460 | 810 | 450 | 15 | 900 | <u>20</u> |
| 15 | C | 722 | 889 | 390 | 1220 | 900 | 460 | 790 | 180 | 15 | 900 | 30 |
| 16 | D | 722 | 899 | 450 | 1200 | 920 | 450 | 800 | 450 | 20 | 910 | 20 |
| 17 | <u>E</u> | 707 | 870 | 359 | 1220 | 930 | 470 | 800 | 450 | 15 | 890 | 30 |
| 18 | <u>F</u> | 687 | 829 | 443 | 1200 | 880 | 450 | 750 | 180 | 15 | 840 | 30 |
| 19 | <u>G</u> | 759 | 934 | 427 | 1210 | 940 | 480 | 820 | 180 | 20 | 950 | 10 |
| 20 | <u>H</u> | 736 | 885 | 431 | 1220 | 920 | 460 | 770 | 450 | 15 | 890 | 30 |
| 21 | <u>I</u> | 662 | 841 | 394 | 1200 | 890 | 480 | 780 | 420 | 20 | 850 | 30 |
| 22 | <u>J</u> | 694 | 861 | 398 | 1220 | 900 | 460 | 760 | 120 | 20 | 880 | 30 |
| 23 | <u>K</u> | 704 | 870 | 434 | 1190 | 910 | 460 | 800 | 360 | 20 | 880 | 20 |
| 24 | <u>L</u> | 720 | 898 | 424 | 1180 | 920 | 480 | 800 | 420 | 20 | 910 | 30 |

| | First cooling | | | Second cooling | | Reheating | | |
|---|---|---|---|---|---|---|---|---|
| No | First cooling rate (° C./s) | First cooling stop temperature (° C.) | Third holding time (s) | Second cooling rate (° C./s) | Second cooling stop temperature (° C.) | Reheating temperature (° C.) | Fourth holding time (s) | Coating or plating |
| 1 | 30 | 450 | 30 | 30 | 250 | 400 | 300 | — |
| 2 | 30 | 460 | 30 | 30 | 200 | 410 | 300 | — |
| 3 | 30 | 390 | 20 | 30 | 250 | 420 | 400 | — |
| 4 | 30 | <u>460</u> | 20 | 30 | 200 | 380 | 300 | — |
| 5 | <u>5</u> | 450 | 30 | 30 | 190 | 360 | 400 | — |
| 6 | 30 | 460 | 30 | 30 | 220 | 410 | 180 | GI |
| 7 | 30 | 420 | 40 | 30 | 150 | 350 | 420 | — |
| 8 | 30 | 440 | 30 | 30 | 200 | 310 | 600 | — |
| 9 | 30 | 480 | 30 | 30 | 250 | 360 | 400 | — |
| 10 | 20 | 470 | 30 | 20 | <u>350</u> | 400 | 360 | — |
| 11 | 30 | 420 | 30 | 30 | <u>180</u> | 320 | 240 | GA |
| 12 | 30 | 420 | 30 | 30 | 150 | 350 | 180 | — |
| 13 | 30 | 450 | 30 | 30 | 200 | 420 | 600 | — |
| 14 | 30 | 400 | <u>100</u> | 30 | 240 | 420 | 600 | — |
| 15 | 30 | 420 | <u>30</u> | 30 | 220 | 400 | 400 | EG |
| 16 | 30 | 480 | 30 | 30 | 140 | 370 | 240 | — |
| 17 | 20 | 480 | 30 | 30 | 150 | 360 | 400 | — |
| 18 | 20 | 480 | 40 | 20 | 200 | 410 | 240 | — |
| 19 | 30 | 450 | 30 | 30 | 250 | 390 | 210 | — |
| 20 | 30 | 450 | 20 | 30 | 150 | 380 | 300 | — |

TABLE 2-1-continued

| 21 | 20 | 430 | 30 | 20 | 170 | 370 | 420 | — |
| 22 | 30 | 440 | 30 | 30 | 200 | 410 | 270 | — |
| 23 | 30 | 450 | 40 | 30 | 160 | 370 | 480 | — |
| 24 | 30 | 460 | 30 | 30 | 200 | 350 | 600 | — |

* Underlines indicate outside the appropriate range according to the present disclosure.

TABLE 2-2

| No | Steel sample ID | Ac1 (°C.) | Ac3 (°C.) | Ms (°C.) | SRT (°C.) | FDT (°C.) | CT (°C.) | First heating temperature (°C.) | First holding time (s) | Heating rate (°C./s) | Second heating temperature (°C.) | Second holding time (s) | First cooling rate (°C./s) | First cooling stop temperature (°C.) | Third holding time (s) | Second cooling rate (°C./s) | Second cooling stop temperature (°C.) | Reheating temperature (°C.) | Fourth holding time (s) | Coating or plating |
|---|---|---|---|---|---|---|---|---|---|---|---|---|---|---|---|---|---|---|---|---|
| 25 | M | 687 | 841 | 414 | 1220 | 890 | 450 | 750 | 480 | 20 | 860 | 30 | 30 | 430 | 30 | 30 | 160 | 400 | 240 | — |
| 26 | N | 711 | 883 | 428 | 1230 | 920 | 460 | 780 | 420 | 15 | 900 | 20 | 30 | 450 | 30 | 30 | 150 | 400 | 300 | GI |
| 27 | O | 745 | 914 | 431 | 1200 | 930 | 460 | 820 | 30 | 15 | 920 | 10 | 30 | 450 | 30 | 30 | 230 | 370 | 180 | — |
| 28 | P | 696 | 845 | 427 | 1210 | 890 | 460 | 780 | 240 | 15 | 860 | 20 | 30 | 440 | 30 | 30 | 250 | 410 | 240 | GA |
| 29 | Q | 695 | 855 | 418 | 1180 | 900 | 450 | 780 | 330 | 15 | 900 | 30 | 30 | 430 | 30 | 30 | 160 | 380 | 300 | — |
| 30 | R | 702 | 873 | 404 | 1200 | 920 | 480 | 800 | 440 | 15 | 890 | 20 | 30 | 430 | 30 | 30 | 150 | 320 | 240 | GA |
| 31 | S | 697 | 857 | 395 | 1220 | 890 | 450 | 780 | 300 | 15 | 870 | 30 | 30 | 430 | 30 | 30 | 220 | 340 | 180 | GA |
| 32 | T | 733 | 903 | 435 | 1200 | 920 | 480 | 800 | 120 | 15 | 920 | 30 | 30 | 450 | 30 | 30 | 200 | 330 | 300 | GI |
| 33 | U | 708 | 879 | 392 | 1190 | 900 | 490 | 800 | 300 | 15 | 890 | 30 | 30 | 420 | 20 | 30 | 240 | 350 | 270 | GA |
| 34 | V | 714 | 872 | 421 | 1220 | 890 | 470 | 780 | 600 | 20 | 890 | 30 | 30 | 460 | 20 | 30 | 250 | 360 | 300 | — |
| 35 | W̄ | 705 | 865 | 420 | 1200 | 910 | 460 | 750 | 480 | 15 | 880 | 20 | 30 | 350 | 30 | 30 | 200 | 350 | 420 | — |
| 36 | W | 705 | 865 | 420 | 1200 | 910 | 460 | 760 | 300 | 15 | 890 | 30 | 30 | 450 | 30 | 30 | 60 | 310 | 150 | — |
| 37 | E | 707 | 870 | 359 | 1200 | 930 | 470 | 790 | 480 | 15 | 890 | 20 | 30 | 420 | 40 | 30 | 180 | 340 | 600 | — |
| 38 | W̄ | 705 | 865 | 420 | 1200 | 910 | 460 | 730 | 300 | 15 | 900 | 40 | 30 | 460 | 30 | 30 | 250 | 340 | 720 | — |
| 39 | X | 708 | 869 | 407 | 1230 | 900 | 470 | 680 | 300 | 20 | 880 | 30 | 30 | 450 | 20 | 30 | 200 | 350 | 400 | — |
| 40 | X | 708 | 869 | 407 | 1230 | 900 | 470 | 750 | 600 | 20 | 880 | 2 | 30 | 460 | 30 | 30 | 220 | 380 | 600 | — |
| 41 | X | 708 | 869 | 407 | 1230 | 900 | 470 | 770 | 480 | 20 | 890 | 20 | 30 | 520 | 40 | 30 | 240 | 400 | 300 | — |
| 42 | X | 708 | 869 | 407 | 1230 | 900 | 470 | 760 | 900 | 20 | 890 | 20 | 30 | 450 | Mild cooling | 30 | 220 | 350 | 480 | — |
| 43 | X | 708 | 869 | 407 | 1230 | 900 | 470 | 750 | 300 | 20 | 880 | 20 | 30 | 440 | 5 | 30 | 200 | 330 | 480 | — |
| 44 | X | 708 | 869 | 407 | 1230 | 900 | 470 | 740 | 600 | 20 | 880 | 20 | 30 | 460 | 30 | 30 | 180 | 330 | 600 | — |
| 45 | X | 708 | 869 | 407 | 1230 | 900 | 470 | 750 | 420 | 20 | 890 | 20 | 100 | 440 | 30 | 100 | 150 | 330 | 300 | — |
| 46 | X | 708 | 869 | 407 | 1230 | 900 | 470 | 740 | 300 | 20 | 880 | 30 | 30 | 450 | 20 | 30 | 200 | 330 | 600 | — |
| 47 | X | 708 | 869 | 407 | 1230 | 900 | 470 | 740 | 240 | 20 | 890 | 30 | 30 | 440 | 20 | 30 | 240 | 520 | 5 | — |
| 48 | X | 708 | 869 | 407 | 1230 | 900 | 470 | 750 | 300 | 5 | 890 | 40 | 30 | 460 | 30 | 30 | 200 | 380 | 360 | — |
| 49 | X | 708 | 869 | 407 | 1230 | 900 | 470 | 740 | 360 | 20 | 880 | 20 | 30 | 450 | 20 | 30 | 190 | 410 | 30 | — |
| 50 | X | 708 | 869 | 407 | 1230 | 900 | 470 | 750 | 420 | 20 | 880 | 30 | 30 | 440 | 30 | 30 | 200 | 330 | 1500 | — |
| 51 | X | 708 | 869 | 407 | 1230 | 900 | 470 | 760 | 600 | 20 | 890 | 40 | 30 | 450 | 30 | 30 | 220 | 410 | 2200 | — |
| 52 | AA | 712 | 871 | 434 | 1200 | 920 | 450 | 760 | 300 | 20 | 890 | 20 | 30 | 460 | 30 | 30 | 220 | 400 | 900 | — |
| 53 | AB | 720 | 886 | 420 | 1200 | 900 | 450 | 770 | 450 | 20 | 900 | 30 | 30 | 460 | 30 | 30 | 240 | 400 | 900 | — |
| 54 | AC | 696 | 852 | 423 | 1200 | 910 | 450 | 770 | 450 | 20 | 880 | 20 | 30 | 450 | 30 | 30 | 220 | 400 | 900 | — |
| 55 | AD | 704 | 870 | 419 | 1200 | 920 | 440 | 760 | 480 | 20 | 890 | 20 | 30 | 450 | 30 | 30 | 210 | 400 | 900 | — |

* Underlines indicate outside the appropriate range according to the present disclosure.

TABLE 3-1

| | | Microstructure | | | | | | | |
|---|---|---|---|---|---|---|---|---|---|
| No | Steel sample ID | Ferrite (area %) | Tempered M + bainite (area %) | Quenched M (area %) | Retained γ (area %) | Residual microstructure (area %) | Low-Mn ferrite (area %) | All ferrite-low-Mn ferrite (area %) | Average grain size of low-Mn ferrite (μm) |
| 1 | A | <u>44</u> | <u>44</u> | 7 | 5 | | <u>25</u> | 19 | 6 |
| 2 | A | 27 | 67 | 4 | 2 | | 16 | 11 | <u>13</u> |
| 3 | A | 20 | 71 | 8 | 1 | | 15 | <u>5</u> | 8 |
| 4 | A | 28 | 59 | 10 | 3 | | 16 | 12 | 8 |
| 5 | A | <u>35</u> | <u>43</u> | 11 | 1 | 10 (pearlite) | 18 | 17 | 6 |
| 6 | A | 27 | 63 | 8 | 2 | | 13 | 14 | 6 |
| 7 | B | 27 | 61 | 10 | 2 | | 15 | 12 | 4 |
| 8 | B | 26 | 64 | 9 | 1 | | 18 | <u>8</u> | 7 |
| 9 | B | <u>5</u> | 83 | 10 | 2 | | <u>3</u> | <u>2</u> | 2 |
| 10 | B | 21 | 48 | <u>30</u> | 1 | | 11 | 10 | 5 |
| 11 | B | 26 | 65 | 8 | 1 | | 14 | 12 | 5 |
| 12 | C | 24 | 65 | 9 | 2 | | 11 | 13 | 6 |
| 13 | C | <u>10</u> | 76 | 12 | 2 | | <u>3</u> | 7 | 3 |
| 14 | C | <u>35</u> | <u>50</u> | 11 | 4 | | 12 | 23 | 5 |
| 15 | C | 24 | 63 | 10 | 3 | | 11 | 13 | 4 |
| 16 | <u>D</u> | 40 | 54 | 5 | 1 | | 8 | 32 | 3 |
| 17 | <u>E</u> | 21 | 52 | <u>22</u> | 5 | | 10 | 11 | 5 |
| 18 | <u>F</u> | 24 | 69 | 6 | 1 | | 12 | 12 | 6 |
| 19 | <u>G</u> | 21 | 68 | 8 | 3 | | 10 | 11 | 4 |
| 20 | <u>H</u> | 27 | 66 | 5 | 2 | | 12 | 15 | 3 |
| 21 | <u>I</u> | 16 | 64 | <u>18</u> | 2 | | 10 | <u>6</u> | 4 |
| 22 | <u>J</u> | 22 | 63 | 13 | 2 | | 10 | 12 | <u>12</u> |
| 23 | <u>K</u> | 22 | 68 | 8 | 2 | | 11 | 11 | <u>11</u> |
| 24 | <u>L</u> | 26 | 65 | 6 | 3 | | 12 | 14 | <u>11</u> |

| | Mechanical characteristics | | | | |
|---|---|---|---|---|---|
| No | TS (MPa) | El (%) | λ (%) | VDA bending angle (°) | Remarks |
| 1 | <u>1045</u> | 15 | <u>44</u> | 93 | Comparative Example |
| 2 | 1147 | 10 | 63 | <u>83</u> | Comparative Example |
| 3 | 1146 | <u>8</u> | <u>42</u> | 90 | Comparative Example |
| 4 | 1115 | 11 | 57 | 91 | Example |
| 5 | 1084 | <u>8</u> | <u>26</u> | <u>84</u> | Comparative Example |
| 6 | 1101 | 12 | 53 | 89 | Example |
| 7 | 1103 | 11 | 57 | 94 | Example |
| 8 | 1095 | 10 | <u>40</u> | 92 | Comparative Example |
| 9 | 1163 | <u>7</u> | <u>41</u> | <u>82</u> | Comparative Example |
| 10 | 1124 | <u>8</u> | <u>35</u> | <u>78</u> | Comparative Example |
| 11 | 1112 | 11 | 50 | 97 | Example |
| 12 | 1101 | 11 | 53 | 93 | Example |
| 13 | 1140 | <u>7</u> | <u>42</u> | 83 | Comparative Example |
| 14 | <u>1049</u> | 11 | <u>45</u> | 90 | Comparative Example |
| 15 | 1135 | 10 | 59 | 90 | Example |
| 16 | <u>720</u> | 20 | 63 | 104 | Comparative Example |
| 17 | 1211 | 11 | <u>38</u> | 88 | Comparative Example |
| 18 | <u>1019</u> | <u>9</u> | 55 | 91 | Comparative Example |
| 19 | 1144 | 11 | 51 | <u>80</u> | Comparative Example |
| 20 | <u>1053</u> | 11 | 59 | 88 | Comparative Example |
| 21 | 1126 | <u>9</u> | <u>33</u> | <u>80</u> | Comparative Example |
| 22 | <u>1060</u> | 11 | 51 | <u>78</u> | Comparative Example |
| 23 | <u>1099</u> | 11 | 52 | <u>80</u> | Comparative Example |
| 24 | <u>1037</u> | 13 | 55 | <u>81</u> | Comparative Example |

* Underlines indicate outside the appropriate range according to the present disclosure.

TABLE 3-2

| No | Steel sample ID | Ferrite (area %) | Tempered M + bainite (area %) | Quenched M (area %) | Retained γ (area %) | Residual microstructure (area %) | Low-Mn ferrite (area %) | All ferrite − low-Mn ferrite (area %) | Average grain size of low-Mn ferrite (μm) | TS (MPa) | El (%) | λ (%) | VDA bending angle (°) | Remarks |
|---|---|---|---|---|---|---|---|---|---|---|---|---|---|---|
| 25 | M | 28 | 60 | 8 | 4 | | 11 | 17 | 4 | 1115 | 11 | 57 | 96 | Example |
| 26 | N | 25 | 63 | 9 | 3 | | 13 | 12 | 3 | 1136 | 10 | 51 | 94 | Example |
| 27 | O | 27 | 62 | 8 | 3 | | 12 | 15 | 5 | 1124 | 10 | 57 | 92 | Example |
| 28 | P | 24 | 66 | 6 | 4 | | 13 | 11 | 4 | 1141 | 12 | 54 | 88 | Example |
| 29 | Q | 26 | 62 | 10 | 2 | | 12 | 14 | 6 | 1129 | 11 | 51 | 94 | Example |
| 30 | R | 21 | 67 | 11 | 1 | | 10 | 11 | 5 | 1135 | 10 | 59 | 90 | Example |
| 31 | S | 28 | 57 | 11 | 4 | | 14 | 14 | 6 | 1084 | 11 | 52 | 96 | Example |
| 32 | T | 28 | 59 | 9 | 4 | | 13 | 15 | 5 | 1088 | 11 | 57 | 97 | Example |
| 33 | U | 29 | 60 | 6 | 5 | | 12 | 17 | 7 | 1091 | 11 | 58 | 97 | Example |
| 34 | <u>V</u> | 24 | 63 | 10 | 3 | | 10 | 14 | 13 | <u>1069</u> | 11 | 55 | <u>77</u> | Comparative Example |
| 35 | W | <u>5</u> | <u>88</u> | 5 | 2 | | <u>4</u> | <u>1</u> | 4 | 1166 | 8 | <u>43</u> | 89 | Comparative Example |
| 36 | W | 22 | 70 | 8 | 0 | | 10 | 12 | 6 | 1195 | 7 | 53 | 90 | Comparative Example |
| 37 | <u>E</u> | 17 | 60 | <u>17</u> | 6 | | 7 | 10 | 6 | 1108 | 14 | <u>27</u> | <u>80</u> | Comparative Example |
| 38 | W | 22 | 66 | 7 | 5 | | 7 | 15 | 5 | 1112 | 13 | 58 | 89 | Example |
| 39 | X | 12 | 77 | 9 | 2 | | <u>4</u> | <u>8</u> | 6 | 1132 | <u>9</u> | <u>44</u> | 92 | Comparative Example |
| 40 | X | <u>31</u> | 66 | 2 | 1 | | 16 | 15 | 5 | <u>1038</u> | 13 | 38 | 88 | Comparative Example |
| 41 | X | 19 | 71 | 4 | 1 | 5 (pearlite) | 7 | 12 | 6 | 1094 | <u>9</u> | <u>34</u> | <u>82</u> | Comparative Example |
| 42 | X | 22 | 68 | 7 | 3 | | 8 | 14 | 5 | 1117 | 11 | 55 | 92 | Example |
| 43 | X | 15 | 72 | 9 | 4 | | 9 | <u>6</u> | 6 | 1144 | 10 | 38 | 96 | Comparative Example |
| 44 | X | 20 | 71 | 6 | 3 | | 8 | 12 | 5 | 1116 | 11 | 59 | 91 | Example |
| 45 | X | 21 | 69 | 6 | 4 | | 7 | 14 | 5 | 1099 | 12 | 53 | 94 | Example |
| 46 | X | 20 | 70 | 4 | 2 | 4 (cementite) | 8 | 12 | 6 | 1088 | <u>9</u> | <u>35</u> | 88 | Comparative Example |
| 47 | X | 18 | 65 | <u>16</u> | 1 | | 7 | 11 | 5 | 1133 | <u>8</u> | <u>30</u> | 86 | Comparative Example |
| 48 | X | <u>8</u> | 82 | 8 | 2 | | <u>1</u> | <u>7</u> | 2 | 1208 | <u>7</u> | <u>44</u> | 89 | Comparative Example |
| 49 | X | 20 | 69 | 8 | 3 | | 8 | 12 | 6 | 1151 | 11 | 55 | 88 | Example |
| 50 | X | 22 | 65 | 4 | 8 | 1 (pearlite) | 10 | 12 | 8 | 1104 | 13 | 55 | 90 | Example |
| 51 | X | 20 | 69 | 3 | 2 | 6 (pearlite) | 8 | 12 | 7 | 1116 | <u>7</u> | <u>29</u> | <u>77</u> | Comparative Example |
| 52 | AA | 24 | 62 | 9 | 5 | | 12 | 12 | 8 | 1112 | 11 | 61 | 90 | Example |
| 53 | AB | 22 | 68 | 5 | 5 | | 11 | 11 | 7 | 1126 | 12 | 55 | 88 | Example |
| 54 | AC | 25 | 62 | 8 | 5 | | 12 | 13 | 7 | 1124 | 11 | 59 | 91 | Example |
| 55 | AD | 25 | 66 | 5 | 4 | | 12 | 13 | 7 | 1118 | 11 | 58 | 94 | Example |

* Underlines indicate outside the appropriate range according to the present disclosure.

In all Examples, the tensile strength was 1080 MPa or more, the elongation El was 10% or more, the hole expansion ratio λ was 50% or more, and the VDA bending angle was 85° or more. Comparative Examples, on the other hand, were inferior in at least one of the tensile strength, the elongation El, the hole expansion ratio λ, and the VDA bending angle.

The invention claimed is:

1. A high-strength cold-rolled steel sheet comprising:
a chemical composition that contains, in mass %,
C: 0.06% or more and 0.15% or less,
Si: 0.10% or more and 1.8% or less,
Mn: 2.00% or more and 3.50% or less,
P: 0.050% or less,
S: 0.0050% or less,
N: 0.0060% or less,
Al: 0.010% or more and 1.0% or less,
Ti: 0.005% or more and 0.075% or less,
Nb: 0.005% or more and 0.075% or less, and
B: 0.0002% or more and 0.0040% or less
with a balance consisting of Fe and inevitable impurities, and satisfies [mol % N]/[mol % Ti]<1, where [mol % N] and [mol % Ti] are respectively a content of N and a content of Ti in steel in mol %; and
a steel microstructure in which:
an area fraction of ferrite is 12% or more and less than 30%;
a total area fraction of tempered martensite and bainite is 55% or more and 85% or less;
an area fraction of quenched martensite is 15% or less;
an area fraction of retained austenite is 1% or more and 10% or less;
an area fraction of low-Mn ferrite having a Mn concentration of 0.8×[% Mn] or less is 5% or more and 20% or less, where [% Mn] is a content of Mn in the steel in mass %;
a result of subtracting the area fraction of the low-Mn ferrite from the area fraction of the ferrite is 10% or more;
an area fraction of a residual microstructure is less than 3%; and an average grain size of the low-Mn ferrite is 10 μm or less.

2. The high-strength cold-rolled steel sheet according to claim 1, wherein the chemical composition further contains, in mass %, at least one element selected from the group consisting of
V: 0.200% or less,
Cr: 0.20% or less,
Mo: 0.20% or less,
Cu: 0.30% or less,
Ni: 0.30% or less,
Sb: 0.100% or less,
Sn: 0.100% or less,
Ca: 0.0050% or less,
Mg: 0.0050% or less,
REM: 0.0050% or less,
Ta: 0.100% or less,
W: 0.500% or less,
Zr: 0.0200% or less, and
Co: 0.100% or less.

3. A high-strength coated or plated steel sheet comprising:
the high-strength cold-rolled steel sheet according to claim 1; and
a coated or plated layer on at least one side of the high-strength cold-rolled steel sheet.

4. A method of producing a high-strength cold-rolled steel sheet, the method comprising:
subjecting a steel slab having the chemical composition that contains, in mass %
C: 0.06% or more and 0.15% or less,
Si: 0.10% or more and 1.8% or less,
Mn: 2.00% or more and 3.50% or less,
P: 0.050% or less,
S: 0.0050% or less,
N: 0.0060% or less,
Al: 0.010% or more and 1.0% or less,
Ti: 0.005% or more and 0.075% or less,
Nb: 0.005% or more and 0.075% or less, and
B: 0.0002% or more and 0.0040% or less
with a balance consisting of Fe and inevitable impurities, and satisfies [mol % N]/[mol % Ti]<1, where [mol % N] and [mol % Ti] are respectively a content of N and a content of Ti in steel in mol % to hot rolling to obtain a hot-rolled sheet;
subjecting the hot-rolled sheet to pickling;
subjecting the hot-rolled sheet after the pickling to cold rolling to obtain a cold-rolled sheet;
thereafter performing a first heating process in which the cold-rolled sheet is heated to a first heating temperature of $Ac_1$ point or higher and ($Ac_3$ point−50° C.) or lower and held in a first heating temperature range of $Ac_1$ point or higher and ($Ac_3$ point−50° C.) or lower for 10 s or more, wherein the $A_{C1}$ point and the $A_{C3}$ point are calculated by the following formulae (1) and (2)

$$Ac_1(° C.)=751-16[\% C]+35[\% Si]-28[\% Mn]-5.5[\% Cu]-16[\% Ni]+13[\% Cr]+3.4[\% Mo] \quad (1);$$

$$Ac_3(° C.)=881-206[\% C]+53[\% Si]-15[\% Mn]-27[\% Cu]-20[\% Ni]-1[\% Cr]+41[\% Mo] \quad (2)$$

where [% M] denotes the content (mass %) of M in steel;
thereafter performing a second heating process in which the cold-rolled sheet is heated to a second heating temperature of $Ac_3$ point or higher and ($Ac_3$ point+40° C.) or lower at a heating rate of 10° C./s or more and held in a second heating temperature range of $Ac_3$ point or higher and ($Ac_3$ point+40° C.) or lower for 5 s or more and 60 s or less;
thereafter performing (a) a first cooling process in which the cold-rolled sheet is cooled to a first cooling stop temperature of 500° C. or lower and higher than Ms point at a first cooling rate of 10° C./s or more, and then performing one selected from (b1) holding at the first cooling stop temperature for 10 s or more and 60 s or less or (b2) cooling from the first cooling stop temperature to higher than Ms point at a third cooling rate of less than 10° C./s for 10 s or more and 60 s or less, wherein the Ms point is calculated by the following formula (3)

$$Ms(° C.)=561-474[\% C]-7.5[\% Si]-33[\% Mn]-17[\% Ni]-17[\% Cr]-21[\% Mo] \quad (3)$$

where [% M] denotes the content (mass %) of M in steel;
thereafter performing a second cooling process in which the cold-rolled sheet is cooled to a second cooling stop temperature of (Ms point−100° C.) or lower and 100° C. or higher at a second cooling rate of 10° C./s or more; and
thereafter performing a reheating process in which the cold-rolled sheet is reheated to a reheating temperature range of the second cooling stop temperature or higher and 450° C. or lower and held in the reheating temperature range of the second cooling stop temperature or higher and 450° C. or lower for 10 s or more and 1800 s or less, to obtain the high-strength cold-rolled steel sheet.

5. A method of producing a high-strength coated or plated steel sheet, the method comprising
subjecting, after the reheating process as recited in claim 4, the high-strength cold-rolled steel sheet to coating or plating treatment to obtain the high-strength coated or plated steel sheet.

6. An automotive part made of, in at least part thereof, the high-strength cold-rolled steel sheet according to claim 1.

7. An automotive part made of, in at least part thereof, the high-strength coated or plated steel sheet according to claim 3.

* * * * *